UNITED STATES PATENT OFFICE.

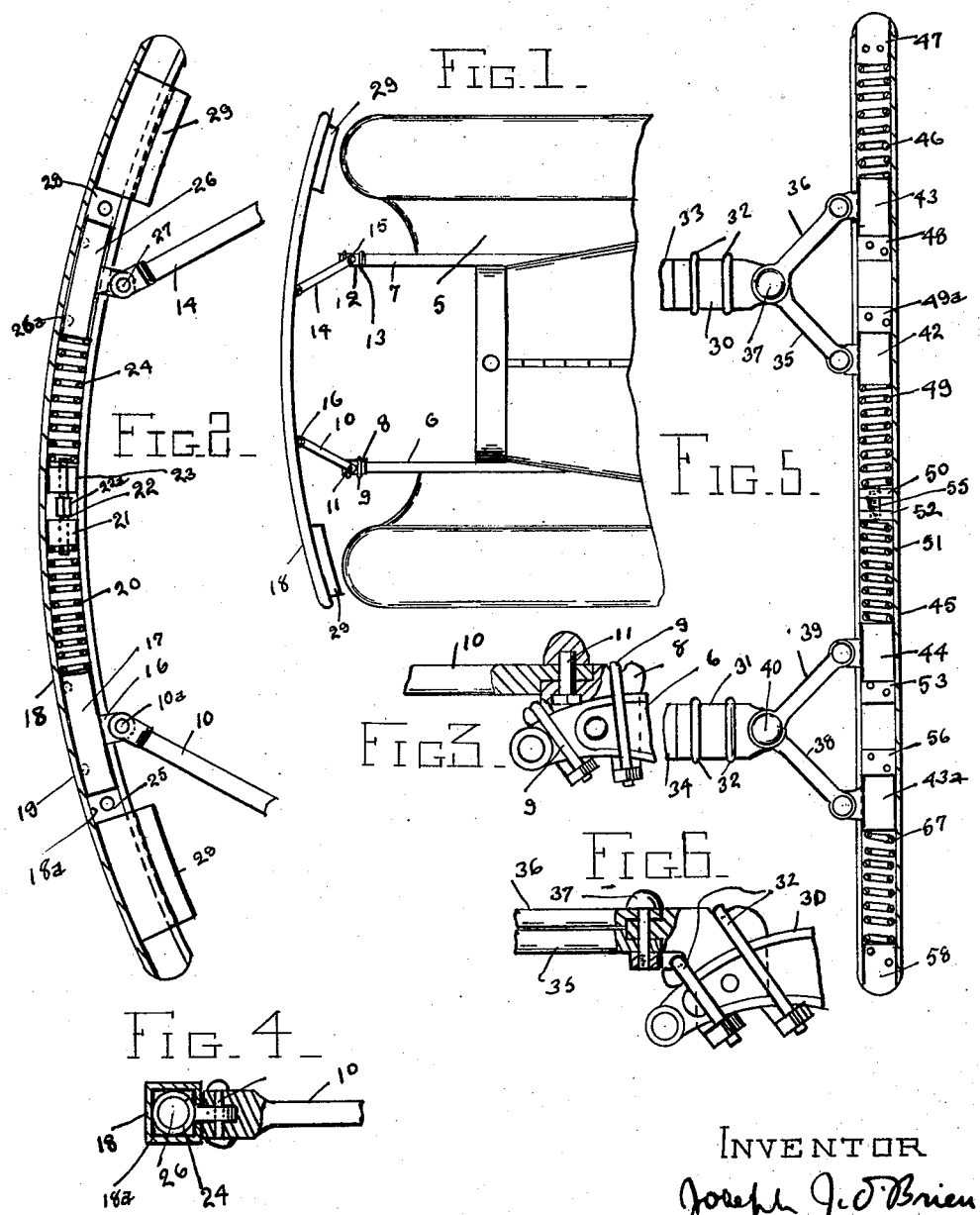

JOSEPH J. O'BRIEN, OF SPRINGFIELD, MASSACHUSETTS.

VEHICLE BUMPER.

1,418,453. Specification of Letters Patent. Patented June 6, 1922.

Application filed September 11, 1920. Serial No. 409,702.

*To all whom it may concern:*

Be it known that I, JOSEPH J. O'BRIEN, a citizen of the United States of America, residing at Springfield, in the county of Hampden and State of Massachusetts, have invented certain new and useful Improvements in Vehicle Bumpers, of which the following is a specification.

This invention relates to improvements in vehicle bumpers and its leading object is to provide a bumper wherein the shock absorbing spring is enclosed by the bumper rod or bar and slides work against this spring which is pivotally connected by arms to the vehicle frame.

With the above and other objects in view this invention relates to certain new and useful constructions, combinations and arrangements of parts, clearly described in the following specification and fully illustrated in the accompanying drawing, in which:

Fig. 1 is a plan view of the bumper applied to the forward end of an automobile.

Fig. 2 is a horizontal sectional view on an enlarged scale of the bumper rod.

Fig. 3 is a detail vertical sectional view showing the connection between the vehicle frame and the bumper rod.

Fig. 4 is a transverse sectional view of the joint between one of the arms and its slide and the bumper bar.

Fig. 5 is a horizontal sectional view of a modified form.

Fig. 6 is a side view partly in section of the bracket therefor.

Referring to the accompanying drawings 5 designates a vehicle such as an automobile which is equipped with forwardly extending frame arms 6 and 7. On the frame arm 6 a bracket 8 is connected by the U bolt 9 and to this bracket 8 an arm 10 is pivotally connected by means of the pivot bolt 11. To the frame arm 7 a bracket 12 is connected by the U bolt 13 and to this bracket 12 the arm 14 is pivotally connected by the pivot bolt 15.

The arm 10 is pivotally connected to the lug 16 of the slide 17 which is arranged to slide in the bumper 18, which is shown to be formed of channel metal, and to be preferably of U shaped construction. The slide 17 carries ball or roller bearings 19 adapted to engage the inner surface of the front wall $18^a$ of the bumper. The slide 17 is engaged by a coil spring 20 which is enclosed by the bumper. The opposite end of the spring engages a stop 21 in the form of a block which has threaded engagement with the right and left screw 22. The screw 22 engages a similar block 23 which engages the spring 24 also enclosed by the bumper. The screw 22 is equipped with a centrally located operating head $22^a$ whereby the same may be rotated by means of a suitable tool and the blocks 21 and 23 moved apart to increase the tension of the springs 20 and 24 or moved toward each other to decrease this tension. The slide 17 engages a stop 25 which limits the movement and the slide 26 pivotally connected to the arm 14 by means of the pivot bolt 27 engages a similar abutment or stop 28 to limit its outward movement.

The slide 26 is equipped with roller or ball bearings $26^a$ so as to have a smooth action against the surface of the bumper.

The bumper is mounted upon the vehicle so that the arms 10 and 14 will be supported diagonally relative to the frame members 6 and 7 and so that diagonal thrusts will be transmitted to the slides 17 and 26 when the bumper engages a tree or obstacle or pressure is otherwise placed upon it. When the bumper is subjected to pressure the slides 17 and 26 will be forced toward each other to compress the springs therebetween.

A buffer 29 is located at each end of the bumper rod so as to protect the tires when the bumper is forced thereagainst.

Any desired tension may be applied on the springs 20 and 24 by adjusting the blocks 21 and 23 therebetween so as to adapt the device to various size vehicles or requirements.

In Figures 5 and 6 I have shown a modified form of the invention consisting of a construction wherein four slides are arranged to work in a single bumper bar. Referring to these figures 30 and 31 designate brackets which are attached to the frame members 33 and 34. To the bracket 30 arms 35 and 36 are pivotally secured thereto by the pivot bolt 37. The arm 35 is pivotally secured to the slide 42 and the arm 36 is pivotally secured to the slide 43. To the bracket 31 the arms 38 and 39 are pivotally secured by the bolt 40. To the arm 38 the slide $43^a$ is pivotally secured to the arm 39 the slide 44 is pivotally secured.

The slide $43^a$ is held against the stop 48 by means of a spring 46 which is retained in place by a stop 47. The slide 42 is held against the stop $49^a$ by the spring 49 and engages the block 50 adjustable on the right and left screw 55. The slide 44 is held against the stop 53 by means of the spring 51 which engages the block 52 adjustable on the screw 55. The slide 43ª is held against the stop 56 by means of the spring 57 which is retained in place by a stop 58. The stops 47, 48, 49ª 53, 56 and 58 are suitably bolted or otherwise secured in position. The arms 35 and 36 extend divergingly from the pivot 37 and the arms 38 and 39 are similarly arranged so that when the bumper bar 45 engages an obstacle diagonal thrusts will be transmitted to the slides 42, 43, 44 and 43ª and the springs contained in the channel of the bumper bar will be compressed.

Having described my invention, I claim:

1. A bumper consisting of a bar or the like, a shock receiving spring thereon, slides engaging the spring and supports pivotally connected with the slides and adapted to be diagonally connected with the frame of the vehicle.

2. A bumber consisting of a bar or the like, a spring therein, slides working against the ends of the spring, and arms pivotally connected with said slides.

3. A bumper consisting of a bar, slides movable on the bar, and a supporting arm pivotally connected with each slide.

4. The combination with a vehicle including a frame, a bumper bar, slides mounted on the bar, and arms pivotally connecting said slides to said frame and diverging from said slides to the frame.

5. A bumper consisting of a bar, said bar providing a channel therein, slides mounted to move in said channel and having portions extending laterally of the bar, a spring disposed in said channel between the slides, and arms pivotally connected with the lateral portions of said slides and adapted to be pivotally connected with the vehicle frame in diagonal relation thereto.

6. A bumper consisting of a channel bar, slides movable in opposite direction in said bar, a pair of said slides being arranged in each end of the bar, a spring compressible by each slide, a pair of arms pivotally connected with each pair of slides and a bracket pivotally connecting the arms to each other, and connectable to a vehicle frame.

7. A bumper comprising a pair of arms appointed to extend diagonally from a vehicle frame, a bumper bar with shock absorbing springs carried by the bumper bar, and means slidable on said bumper bar to compress the springs and have a yielding connection with said arms whereby said means will be moved against said springs when a load is placed upon the bumper or a collision of same with an obstacle.

Signed by me at Springfield, Massachusetts.

JOSEPH J. O'BRIEN.